United States Patent
Jin et al.

(12)

(10) Patent No.: US 11,550,613 B2
(45) Date of Patent: Jan. 10, 2023

(54) COMPUTER SYSTEM

(71) Applicant: Hitachi, Ltd., Tokyo (JP)

(72) Inventors: Azusa Jin, Tokyo (JP); Takaki Nakamura, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 17/010,965

(22) Filed: Sep. 3, 2020

(65) Prior Publication Data

US 2021/0294630 A1 Sep. 23, 2021

(30) Foreign Application Priority Data

Mar. 17, 2020 (JP) .............................. JP2020-046609

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 9/5027* (2013.01); *G06F 9/5077* (2013.01); *G06F 2009/45583* (2013.01); *G06F 2009/45591* (2013.01); *G06F 2009/45595* (2013.01)

(58) Field of Classification Search
CPC .................................................. G06F 9/45558
See application file for complete search history.

(56) References Cited

U.S. PATENT DOCUMENTS

2009/0172666 A1 7/2009 Yahalom et al.
2019/0317816 A1* 10/2019 Chandran ........... H04L 43/0817

* cited by examiner

*Primary Examiner* — Charlie Sun
(74) *Attorney, Agent, or Firm* — Baker Botts L.L.P.

(57) ABSTRACT

The present disclosure provides a computer system in which a virtual computer and a volume can be arranged in a cluster without degrading I/O performance of the virtual computer. A management node is configured to arrange a virtual computer and a volume in which the virtual computer inputs and outputs data in any one of a plurality of nodes, so as to allocate a predetermined resource among resources of a processor, a memory, and a storage drive to the virtual computer and the volume, thereby operating the virtual computer and the volume in the node. When the virtual computer and the volume can be arranged in the same node among the plurality of nodes, the management node determines the same node from the plurality of nodes based on a difference of ratios of resource amounts allocated to the virtual computer and the volume between the plurality of resources.

6 Claims, 10 Drawing Sheets

| VM ID | Volume ID | NUMBER OF CONSUMED CPU CORES | CONSUMED MEMORY CAPACITY | CONSUMED VOLUME CAPACITY | VM ARRANGEMENT DESTINATION NODE ID | VOLUME ARRANGEMENT DESTINATION NODE ID | |
|---|---|---|---|---|---|---|---|
| 1 | 1 | 16Cores | 128GiB | 1TiB | HCI Node-1 | HCI Node-1 | 711 |
| 2 | 2 | 8Cores | 64GiB | 2TiB | HCI Node-1 | HCI Node-2 | 712 |
| ... | ... | ... | ... | ... | ... | ... | |

| NODE ID | TOTAL NUMBER OF CPUS (Cores) | NUMBER OF REMAINING CPUS (Cores) | TOTAL MEMORY CAPACITY (GiB) | REMAINING MEMORY CAPACITY (GiB) | TOTAL DRIVE CAPACITY (GiB) | REMAINING DRIVE CAPACITY (GiB) | |
|---|---|---|---|---|---|---|---|
| HCI Node-1 | 128 | 64 (50%) | 512 | 384 (75%) | 20,000 | 8,000 (40%) | 811 |
| HCI Node-2 | 128 | 112 (86%) | 512 | 256 (50%) | 20,000 | 12,000 (60%) | |
| ... | ... | ... | ... | ... | ... | ... | |

FIG. 6

| | Node-1 | Node-2 | Node-3 | Node-4 | Node-5 | ... |
|---|---|---|---|---|---|---|
| Node-1 | / | 1 | 1 | 2 | 3 | ... |
| Node-2 | 1 | / | 1 | 2 | 3 | ... |
| ... | ... | ... | ... | ... | ... | ... |

FIG. 7

| CLUSTER ID | ATTRIBUTE | RESOURCE TYPE | RESOURCE SEPARATION FLAG |
|---|---|---|---|
| CLUSTER 1 | HCI | CPU | 1 |
| | | Memory | 1 |
| | | DRIVE | 2 |
| ... | ... | ... | ... |

COMPUTER SYSTEM

BACKGROUND OF THE INVENTION

1. Field of the Invention

The present invention relates to a computer system in which a plurality of servers form a cluster, and more particularly to a computer system for implementing a hyper-converged infrastructure (HCI).

2. Description of the Related Art

Virtualization is known as a technique of logically dividing and integrating resources such as a CPU and a memory included in hardware regardless of a physical environment of a computer. A plurality of virtualized computers have an advantage of facilitating expansion and management of a computer system by sharing hardware resources (for example, U.S. Patent Application Publication No. 2009/0172666).

Recently, hyper-converged infrastructure (HCI) attracts attention as a next-generation virtualized infrastructure. The HCI is a virtualization platform that implements a simple configuration by integrating a compute function and a storage function into hardware constituted of only x86 servers, and is also a server/storage shared infrastructure in which storages of a plurality of servers are virtually integrated via software-defined storage (SDS) and thus can be used as one large-scale shared storage.

When a virtual machine (VM) is to be newly arranged on nodes that constitute a cluster, a management node of the cluster uses, for example, Distributed Resource Scheduler (DRS) of VMware corporation, to arrange the new VM in the nodes such that the numbers of VMs are equal among a plurality of servers. On the other hand, the management node may, independently of VM arrangement, set volumes (LUNs) of a storage pool, which are allocated to virtual hard disks of the VMs, from the shared storage to the plurality of nodes in order by, for example, a round robin method.

However, even in a cluster that intends to implement an HCI environment, when the management node arranges or sets a VM and a volume in the cluster without associating them with each other, there are problems that I/O performance of the VM is degraded and that resources to be allocated to the VM cannot be effectively used due to a bandwidth bottleneck.

SUMMARY OF THE INVENTION

Therefore, in view of the above problems, the invention aims to provide a computer system in which a virtual computer and a volume can be arranged in a cluster without degrading I/O performance of the virtual computer, and a setting method thereof.

In order to achieve the above object, the invention provides a computer system and a setting method of the virtual computer. The computer system includes: a plurality of nodes each including a processor and a memory; a storage drive; and a management device. The management device is configured to: arrange a virtual computer and a volume in which the virtual computer inputs and outputs data in any one of the plurality of nodes, so as to allocate a predetermined resource among resources of the processor, the memory, and the storage drive to the virtual computer and the volume, thereby operating the virtual computer and the volume. When the virtual computer and the volume are capable of being arranged in the same node among the plurality of nodes, the management device determines the same node from the plurality of nodes based on a difference of ratios of resource amounts allocated to the virtual computer and the volume between the plurality of resources.

According to the invention, it is possible to provide a computer system in which a virtual computer and a volume can be arranged in a cluster without degrading I/O performance of the virtual computer.

DESCRIPTION OF THE PREFERRED EMBODIMENTS

Hereinafter, embodiments of the invention will be described in detail with reference to the drawings. The following description and drawings are examples for describing the invention, and may be omitted and simplified as appropriate for clarification of the description. Then, all combinations of features described in the embodiments are not necessarily indispensable to a solution of the invention. The invention is not limited to the embodiments, and all application examples meeting ideas of the invention are included in the technical scope of the invention. Those skilled in the art can make various additions and changes to the invention within the scope of the invention. The invention can be implemented in various other forms. Unless otherwise limited, each component may be either plural or singular.

In the following description, various types of information may be described in terms of expressions such as "table", "table", "list", and "queue". The various types of information may be represented by other data structures. "XX table", "XX list", and the like are referred to as "XX information", to indicate that the information does not depend on a data structure. When a content of each type of information is described, expressions such as "identification information", "identifier", "name", "ID", and "number" are used, but these expressions may be replaced with each other.

In the following description, when the same kind of elements are not distinguished from each other, a reference sign numeral or a common number in the reference sign numeral is used, and when the same kind of elements are distinguished, the reference sign numeral of the element may be used, or an ID allocated to the element may be used instead of the reference sign numeral.

Further, in the following description, processing performed by executing a program may be described, and since the program performs predetermined processing while using storage resources (for example, a memory) and/or an interface device (for example, a communication port), or the like as appropriate by being executed with at least one or more processors (for example, a CPU), a subject of the processing may be the processor. Similarly, the subject of the processing performed by executing the program may be a controller, a device, a system, a computer, a node, a storage system, a storage device, a server, a management computer, a client, or a host including a processor. In order to clarify the subject of the processing performed by executing the program, the subject may be the program executed by the processor instead of the processor. The subject of the processing (for example, a processor) performed by executing the program may include a hardware circuit that performs a part or all of the processing. For example, the subject of the processing performed by executing the program may include a hardware circuit that executes encryption and decryption, or compression and decompression. The processor operates as a functional unit that implements a predetermined function by operating according to the program. The device and the system including the processor are a device and a system including these functional units.

The program may be installed from a program source into a device such as a computer. The program source may be, for example, a program distribution server or a computer readable storage medium. When the program source is the program distribution server, the program distribution server may include the processor (for example, a CPU) and the storage resources, and the storage resources may further store a distribution program and a program to be distributed. Then, the processor of the program distribution server may distribute the program to be distributed to other computers by the processor of the program distribution server executes the distribution program. Further, in the following description, two or more programs may be implemented as one program, or one program may be implemented as two or more programs.

A "virtual machine" is implementation of a specific software-based machine in a virtualized environment that virtualizes hardware resources of an actual computer (for example, a CPU, a memory, or the like) or converts the hardware resources into the virtualized environment. The virtual machine can execute a unique OS and application on basic physical resources in the same manner as the actual computer. Virtualization functions by directly inserting a thin layer of software on computer hardware or a host OS. The software layer includes a virtual machine monitor or "hypervisor" that dynamically and transparently allocates hardware resources. Multiple OSs are executed simultaneously on a single physical computer and share hardware resources with each other.

In recent years, container-based virtualization technique becomes widespread. Compared to a virtual machine that is created to be executed on an OS of a host and that imitates an independent physical machine, a container is obtained by virtualizing applications that can be executed directly in a user space on a kernel of the OS. An application such as a web server and a database to be executed within the container does not require an emulation layer or a hypervisor layer in an interface with the physical machine. Instead, the "containerized" applications can function using a normal system call of the OS. In this way, since the container does not require a virtualized guest OS, the container generally provides a quicker (for example, quicker transferring, and quicker boot or load) OS-level virtualization than the virtual machine.

Figure 1:
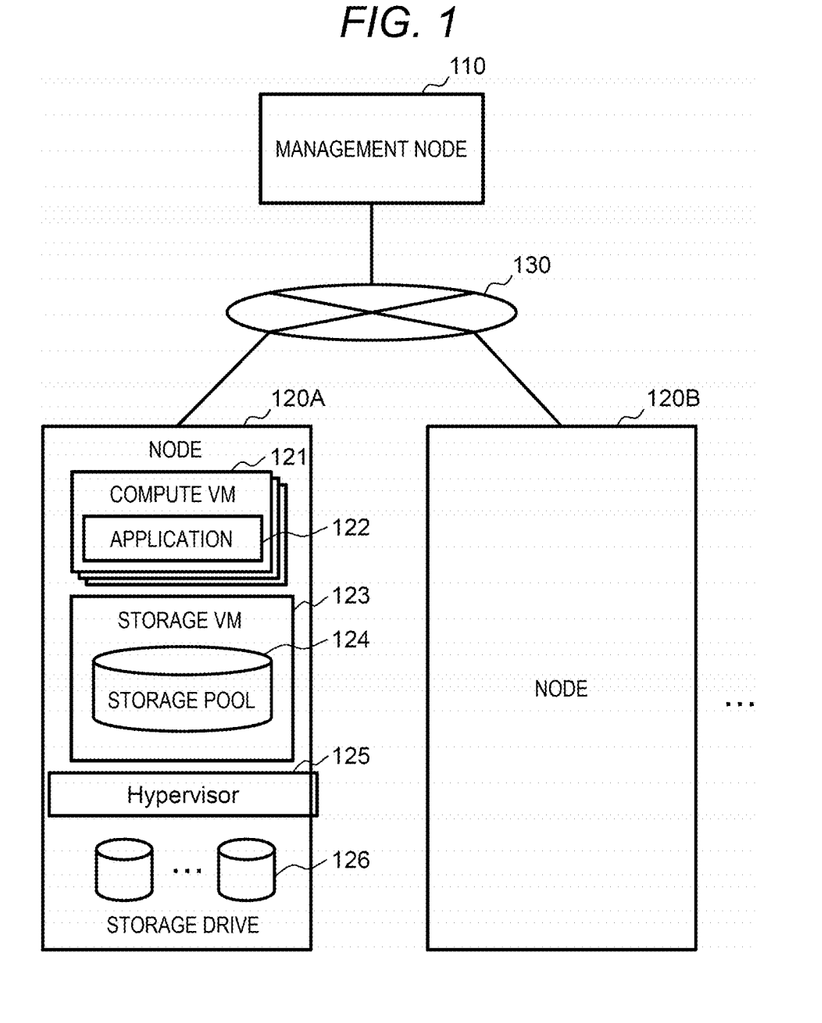
FIG. 1 is a hardware block configuration diagram showing an example of an embodiment of a computer system according to the invention.

FIG. 1 is an example of an embodiment of a computer system according to the invention, and shows a hardware block diagram of a system in which a plurality of servers operate as a cluster. The cluster includes a plurality of managed nodes 120A, 120B, . . . , and a management node 110 (management device) for managing the managed nodes. Each node includes computer resources such as a CPU, a memory, and a storage drive.

The management node 110 (vCenter Server) logically groups the plurality of managed nodes 120 (ESXi servers) under the management of the management node 110 to create a server group, and implements a cluster in which the server group operates cooperatively. The management node 110 and the managed nodes 120 are connected to each other by a network 130. Hereinafter, each managed node 120 will be simply referred to as a "node". Further, an integrated management framework (vCenter: management device) of the management node may be executed by a virtual machine based on virtualization software (ESXi) of the managed nodes 120 instead of a dedicated machine.

The computer system of FIG. 1 is a cluster for implementing the HCI environment described above, and each of the plurality of nodes includes a plurality of compute VMs (121), each of which operates an application 122, and a storage VM (123) that operates a storage controller and provides volumes (LUNs) from a storage pool 124 to virtual hard disks of the compute VMs. The plurality of compute VMs (121) and the storage VM (123) share resources (a CPU, a memory, a volume, and the like) of the node with each other.

A hypervisor 125 (ESXi) of each node creates a virtual computer (compute VM, storage VM) in the physical node, and executes a plurality of different OSs (OS for compute VM, OS for storage VM) in parallel within the same node. Each compute VM (121) operates applications and middleware by the OS thereof.

The storage VM (123) of each of the plurality of nodes constitutes the storage pool 124 by aggregating a plurality of storage drives 126 in the node as one large storage area.

The storage VM (123) manages the storage pool and records data of virtual hard disk files in volumes of the storage pool. The management node 110 can set a shared storage, which crosses a plurality of nodes or all nodes of a cluster system, in the cluster system by combining or integrating the storage pools of the plurality of nodes.

Therefore, the virtual hard disk of each compute VM (121) corresponds to a volume of the storage pool of the same node or a volume of the storage pool of another node. As described below, the management node 110 preferentially allocates, to the virtual hard disk of each compute VM (121), a volume of the storage pool of the same node.

Figure 2:
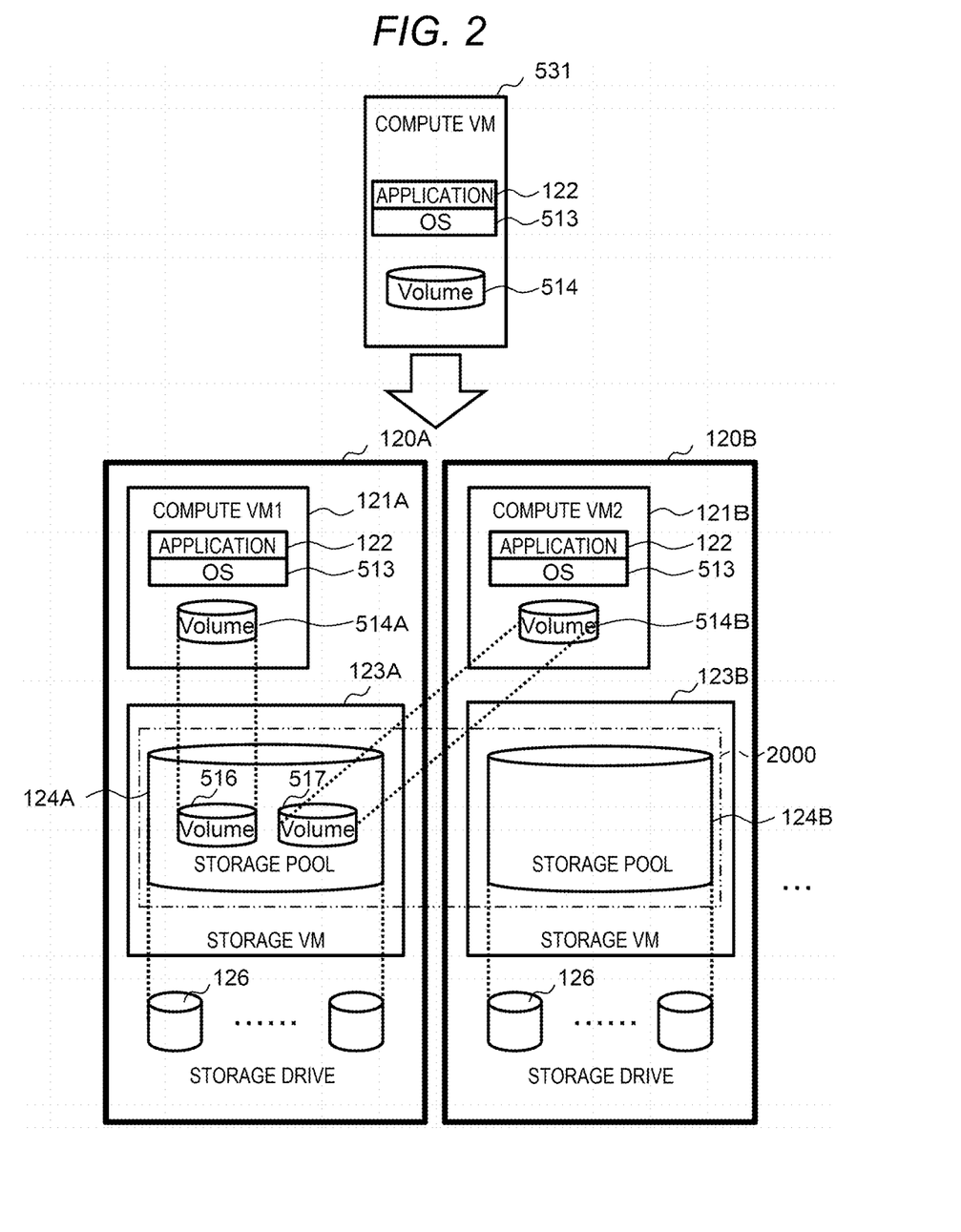
FIG. 2 is a detailed hardware block diagram of a node.

FIG. 2 is a detailed hardware block diagram of a node. Reference numeral 2000 indicates the shared storage for a plurality of nodes. The shared storage is a bundle of the storage pools of the plurality of nodes, and the management node 110 sets a volume in each compute VM from the shared storage.

The storage VM (123) of each of the plurality of nodes bundles storage areas of the plurality of storage drives 126 of the same node to set the storage pool 124. A storage VM (123A) cuts out volumes 516, 517 from a storage pool 124A, and the volume 516 is allocated to a volume (virtual hard disk) 514A of a compute VM1 (121A). Since the virtual hard disks correspond to the volumes of the storage pool by 1:1 via a data store, backup, restoration, and redundancy can be performed in units of virtual machines.

An OS 513 of the compute VM1 (121A) executes the application 122 and issues I/O to the volume 514A. The storage VM (123A) controls reading and writing of data with respect to the volume 516 based on the I/O with respect to the volume 514A.

The volume 516 of the storage pool 124A of the same node 120A is allocated to the volume 514A that is an access destination of the compute VM1 (121A) of the node 120A. On the other hand, the volume 517 of the storage pool 124A of the node 120A is allocated to a volume 514B of a compute VM2 (121B) of the node 120B different from the node 120A.

The volume 514A has a configuration having so-called "locality". Since the I/O for the volume 514A of the compute VM1 (121A) of the node 120A is provided to the volume 516 of the storage pool 124A of the same node, the I/O of the application is processed at a high speed. That is, in the node 120A, a recording/reading destination of the data used by the application 122 of the compute VM1 (121A) is the storage drive 126 of the local node (the same node 120A).

On the other hand, in the volume 514B, since I/O from the compute VM2 (121B) of the node 120B passes through a network switch between the node 120B and the node 120A and is provided to the volume 517 of the storage pool 124A by the storage VM (123A) of the other node 120A, I/O processing performance degrades.

As will be described later, even in a case of the volume 514B, the management node 110 sets a volume in the compute VM2 (121B) from a storage pool of another node among the plurality of nodes, such that the number of hops of the network switch between the node 120B and the volume is as small as possible, that is, a network distance between the node 120B and the volume is short.

Further, a correspondence relationship between the computes VM and the storage pools is not limited to that shown in FIG. 2. For example, FIG. 2 illustrates a shared storage applied to two nodes for simplification, but the shared storage may be set for all the nodes. Further, the volumes of the storage pool may be sub volumes obtained by dividing one volume.

The management node arranges a virtual computer and a volume in which the virtual computer inputs and outputs data in any one of the plurality of nodes, so as to allocate a predetermined resource among resources of the processor, the memory, and the storage drive to the virtual computer and the volume, thereby operating the virtual computer and the volume in the node.

In FIG. 2, reference numeral 531 indicates a new compute VM that is to be initially arranged in any one of the plurality of nodes that constitute the cluster. In order for the OS (513) of the compute VM to execute the application 122 and the application 122 to use a volume (virtual hard disk) 514, hardware resources of an arrangement destination node are allocated to the compute VM.

In a multi-node configuration including the plurality of nodes, for the purpose of data redundancy, the storage VM executes writing of data to be written to the storage pool to a storage pool of a node different from the node in which the storage VM is present.

Redundancy processing includes, for example, mirroring and Erasure Coding. The storage VM uses the resources of the node to execute the I/O to the storage pool, that is, perform operation of writing data to the storage drive or reading data from the storage drive.

Figure 3:
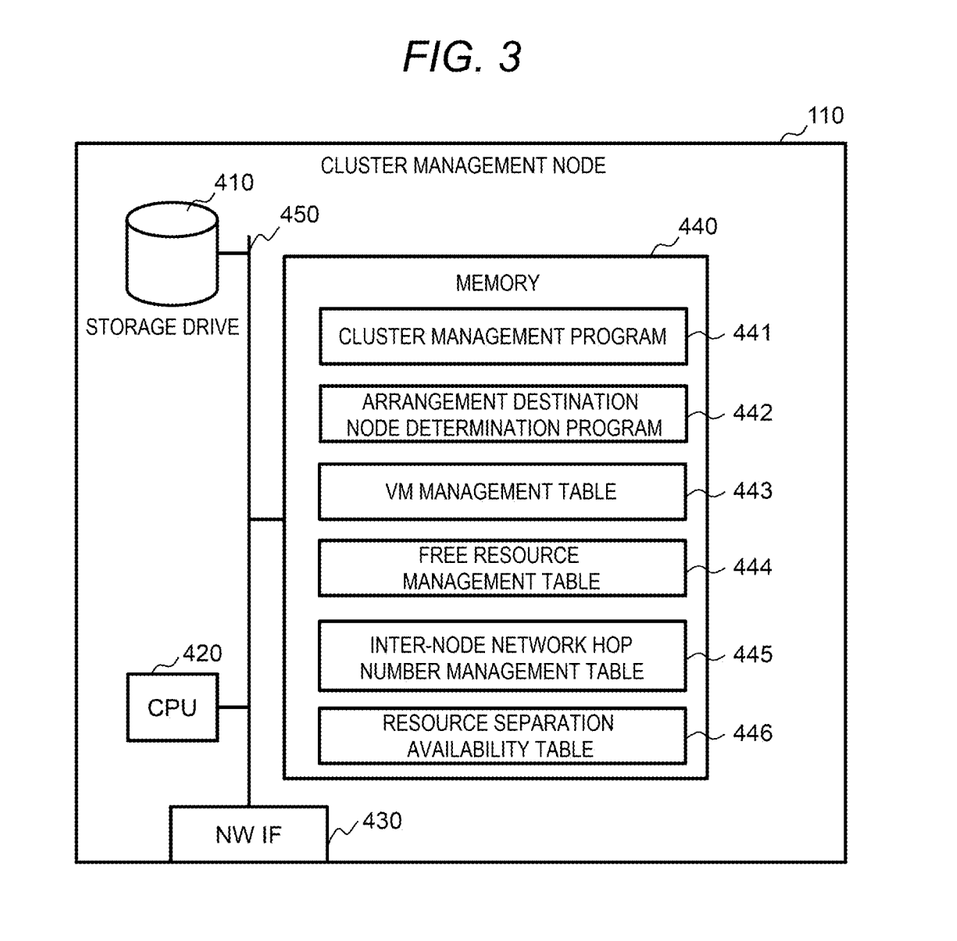
FIG. 3 is a functional block diagram of a cluster management node.

FIG. 3 shows an example of a functional block of the integrated management framework of the cluster in the management node 110. The management node 110 includes a storage drive 410, a controller (CPU) 420, a network interface 430, a memory 440, and a bus 450 connecting these units.

The memory 440 includes a cluster management program 441, an arrangement destination node determination (or selection) program 442, a VM management table 443, a free resource management table 444, an inter-node network hop number management table 445, and a resource separation availability table 446. Each program may be paraphrased as a means, a function, a circuit, a unit, or the like.

In order for the virtual machine to exhibit sufficient performance, a management client first selects, through a dedicated user interface, a storage policy such as a type of storage to be used, a capacity and performance for using the storage, and a frequency of backup, and sets service level details in the integrated management framework of the management node 110.

The cluster management program 441 executes general management and special management for the cluster such as management of cluster attributes and resources for each of the plurality of nodes. The cluster attributes include SDS and composable in addition to the HCI described above. Configurations of SDS and composable will be described below.

The arrangement destination node determination program 442 determines, selects, sets, judges, or certifies the nodes to which the compute VM and the storage pool volume for the compute VM are to be arranged, respectively, based on a setting of the management client, under control of the cluster management program 441.

Figure 4:
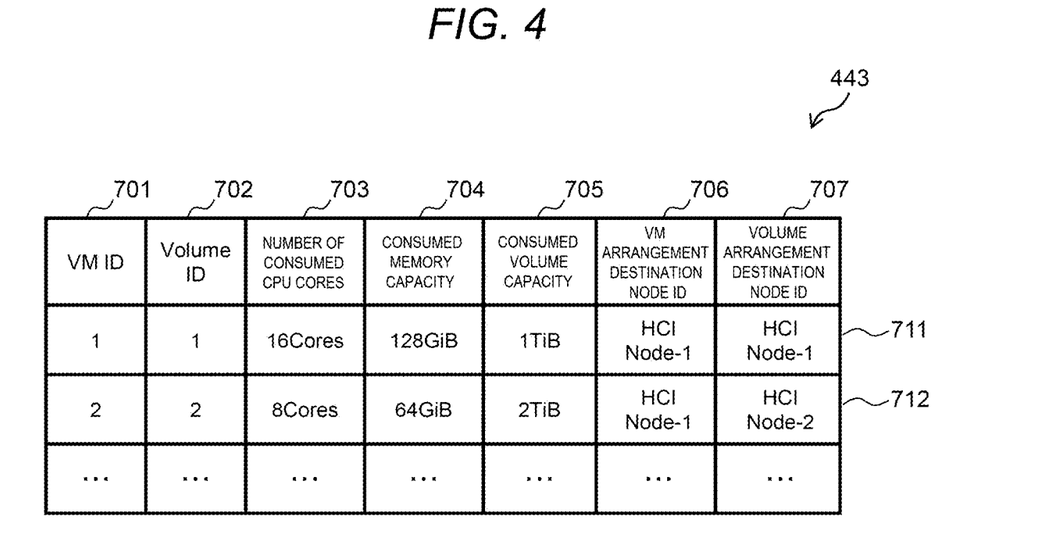
FIG. 4 is an example of a VM management table for managing the computer system of FIG. 1.

FIG. 4 shows an example of the VM management table 443 in the HCI cluster. The VM management table 443 records management information for each compute VM. 701 records a compute VM ID.

702 is an ID of the volume (the storage pool volume) for the compute VM. 703 is a consumption amount of a resource 1 (the number of CPU cores) allocated to the compute VM. 704 is a consumption amount of a resource 2 (memory capacity) allocated to the compute VM. 705 is a consumption amount of a resource 3 (a volume capacity) allocated to the compute VM. 706 is an arrangement destination node ID of the compute VM. 707 is an arrangement destination node ID of the volume 702.

711 indicates that the compute VM ID is 1, the number of consumed CPU cores of the compute VM is "16 cores", the consumed memory capacity of the compute VM is "128 GB", the consumed volume capacity of the compute VM is "1 TB", the arrangement destination node ID of the compute VM is "HCI_Node-1" of the HCI cluster, and the arrangement destination node ID of the volume (702) is the same "HCI_Node-1". That is, 711 indicates a structure having the above-described locality for the compute VM.

712 indicates that the compute VM ID is 2, the number of consumed CPU cores of the compute VM is "8 cores", the consumed memory capacity of the compute VM is "64 GB", the consumed volume capacity of the compute VM is "2 TB", the arrangement destination node ID of the compute VM is "HCI_Node-1" of the HCI cluster, and the arrangement destination node ID of the volume 702 is "HCI_Node-2".

That is, the volume 702 for the compute VM (ID: 2) is present in a node different from the node in which the compute VM is arranged. As described above, the node in which the compute VM is arranged and the node in which the volume 702 for the compute VM is present have a close relationship in which the number of hops of the network switch is small, and the locality described above is not harmed.

The cluster management program 441 updates the VM management table 443 each time the cluster management program 441 receives a new arrangement request of a compute VM, arrangement destination node change information of a compute VM, and the like from a management user.

Figure 5:
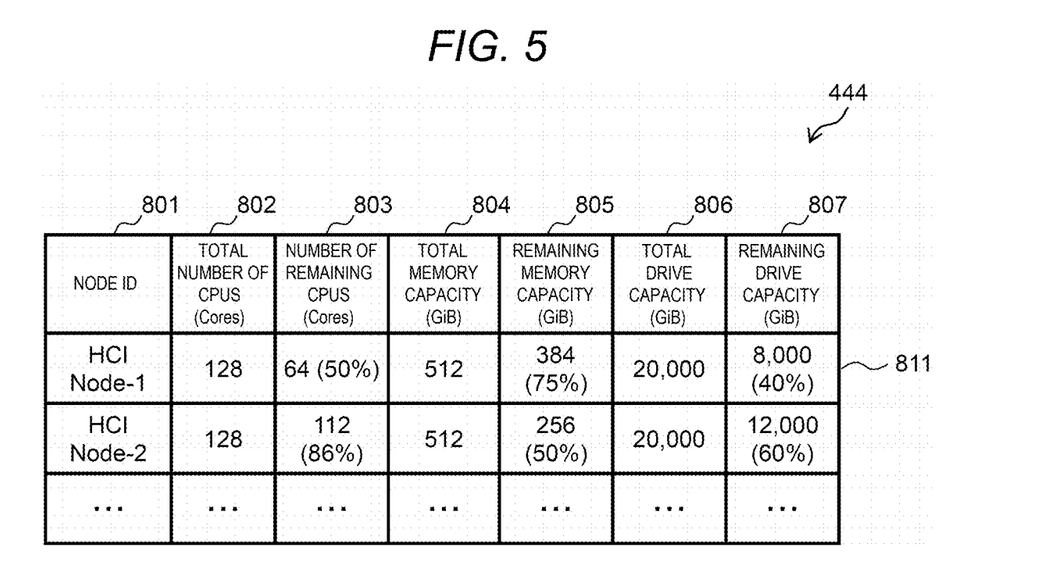
FIG. 5 is an example of a free resource management table.

FIG. 5 shows an example of the free resource management table 444. The table is for managing resources for each node of the cluster. FIG. 5 shows a table of the HCI cluster. 801 is a node ID, 802 is a total number of CPU cores of the node, 803 indicates the number of remaining CPU cores (ratio to the total number of CPU cores) that are not allocated to any compute VM or storage VM, 804 is a total memory capacity of the node, 805 is a remaining memory capacity, 806 is a total capacity of the storage drive of the node, and 807 is a remaining capacity of the storage drive. The cluster management program 441 periodically accesses each of the plurality of nodes to obtain information and updates the free resource management table 444.

Figure 6:
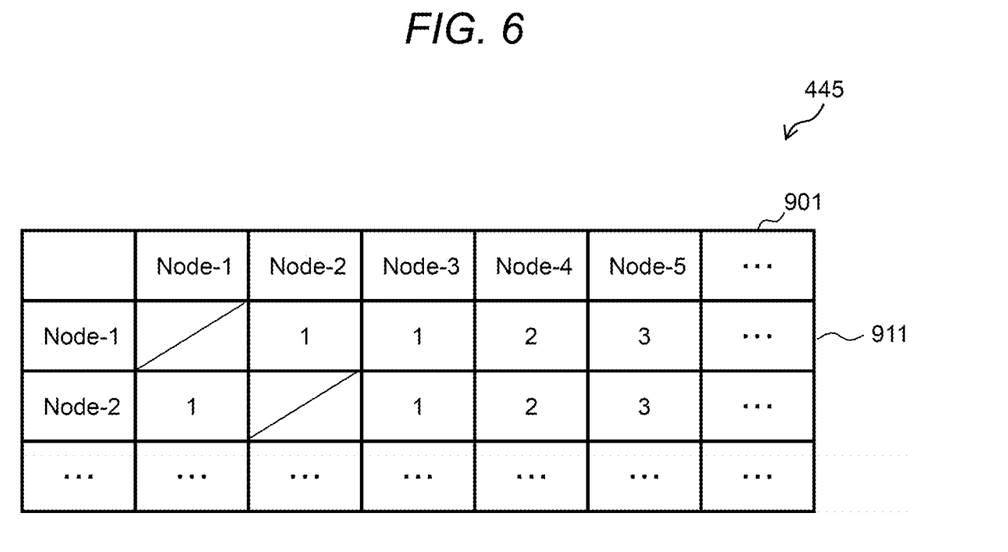
FIG. 6 is an example of an inter-node network hop number management table.

FIG. 6 shows an example of the inter-node network hop number management table 445. The table is a table for managing, for each node, the number of network hops with other nodes constituting the cluster. The number of network hops is, for example, the number of network switches or routers to pass through. For example, the number of network hops between a plurality of nodes having a small network distance in the cluster, such as a plurality of nodes in the same rack, is small. Conversely, the number of network hops between a plurality of nodes having a large network distance in the cluster, such as nodes in different racks, is large.

911 indicates that the number of network hops between Node-1 and Node-2 is 1, that between Node-1 and Node-3 is 1, that between Node-1 and Node-4 is 2, and that between Node-1 and Node-5 is 3. The cluster management program 441 sets or updates the table each time the cluster is set and every time the cluster is updated.

Figure 7:
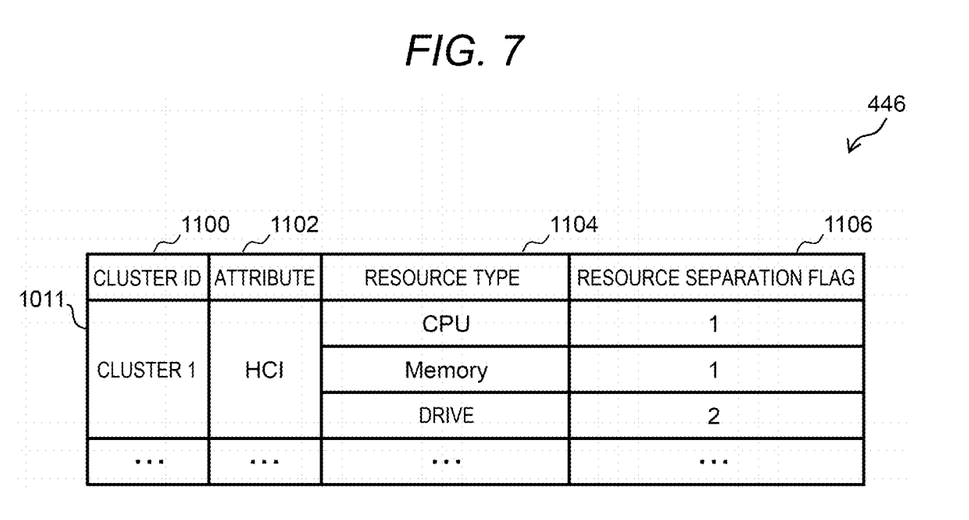
FIG. 7 is an example of a resource separation availability table.

FIG. 7 shows an example of the resource separation availability table. The table manages whether a plurality of resources can be separated/cannot be separated from each other when the hardware resources are allocated to a compute VM or a storage VM for each cluster, and includes a cluster ID 1100, a cluster attribute 1102, a resource type 1104, and a resource separation availability flag 1106.

The cluster attribute includes HCI, SDS, or composable as described above. The resource types include a front end network (FE NW) and an inter-node NW in addition to a CPU, a memory, and a storage drive (volume). The FE NW and the inter-node NW are resources for the storage VM.

Since the resource separation flags of the CPU and the memory are both "1", the resource separation flags cannot be separated from each other and allocated to the compute VM or the storage VM separately. On the other hand, the resource separation flag of the drive is "2", which is different from those of the CPU and the memory, and therefore the drive can be separated from these and allocated to the storage VM.

Figure 8:
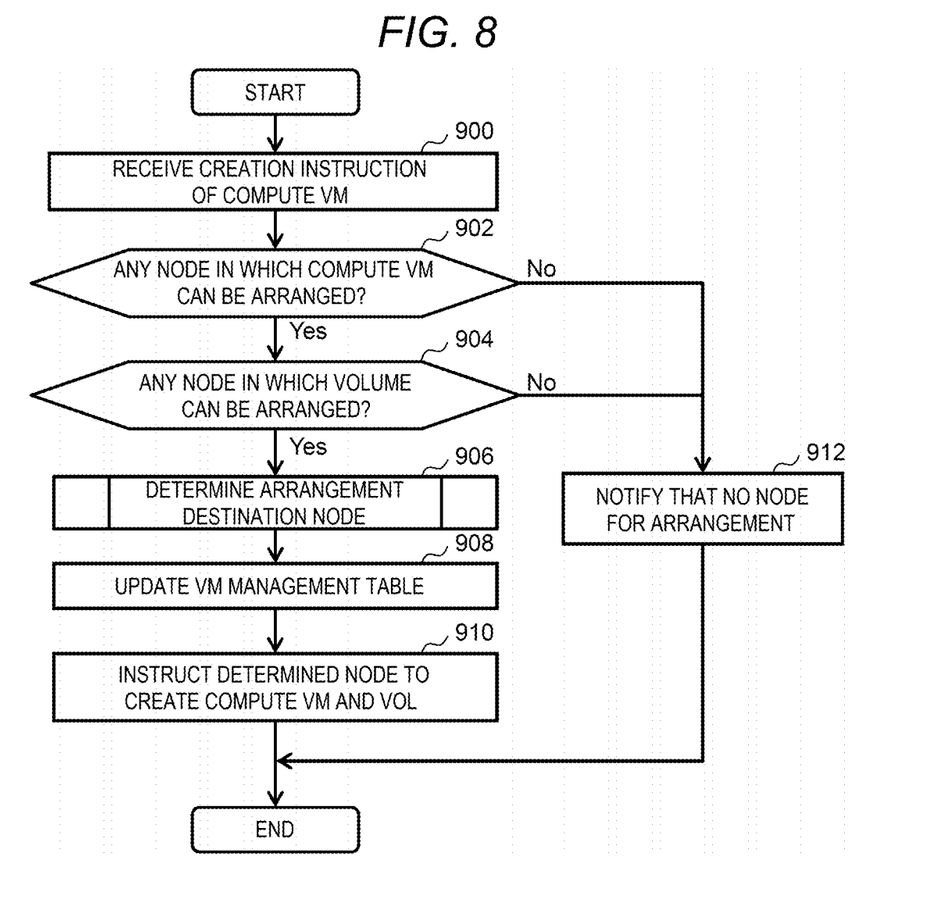
FIG. 8 is a flowchart showing an operation for initially arranging a new compute VM in a node of a cluster system.

Next, an operation for arranging a new VM (compute VM) in the cluster system will be described. FIG. 8 is a flowchart showing an example of the operation. The cluster management program 441 receives an arrangement request of the new VM from the management client (900). The cluster management program 441 determines, based on a setting of the new VM from the management client, the number of CPU cores required by the VM, a memory capacity required by the VM, and a volume capacity required by the compute VM.

Next, the cluster management program 441 determines whether the new VM can be arranged in any node in the cluster (902). The cluster management program 441 refers to the free resource management table 444, and determines whether a node in which the requested resource amounts (the number of CPU cores/memory capacity) of the VM to be arranged can be accommodated is present. Further, the cluster management program 441 refers to the resource separation availability table 446 and determines whether the requested resources are available for separation. In the resource separation availability table, the number of CPU cores/memory capacity cannot be separated from each other. Therefore, the cluster management program 441 determines whether a node in which both the number of CPU cores and the memory capacity can be arranged for the new VM is present.

If the cluster management program 441 affirms the determination (902: Yes), the cluster management program 441 refers to the free resource management table 444 and determines whether a node in which the requested volume amount can be arranged is present (904). If the cluster management program 441 affirms the determination (904: Yes), the cluster management program 441 calls the arrangement destination node determination program 442 and determines the arrangement destination nodes of the compute VM and the volume (906).

The cluster management program 441 receives a VM arrangement destination node ID and a volume arrangement destination node ID from the arrangement destination node determination program 442, adds an entry to the VM management table 443, allocates and records a compute VM ID and a volume ID, and records the number of CPU cores, the memory capacity, the volume capacity, the compute VM arrangement destination node ID, and the volume arrangement destination node ID (908).

The cluster management program 441 refers to the VM management table 443 and instructs the nodes determined by the arrangement destination node determination program to create the compute VM and the volume (910).

If the cluster management program 441 denies step 902 or step 904, the cluster management program 441 notifies the management client that no node in which the requested VM can be arranged is present (912).

Figure 9:
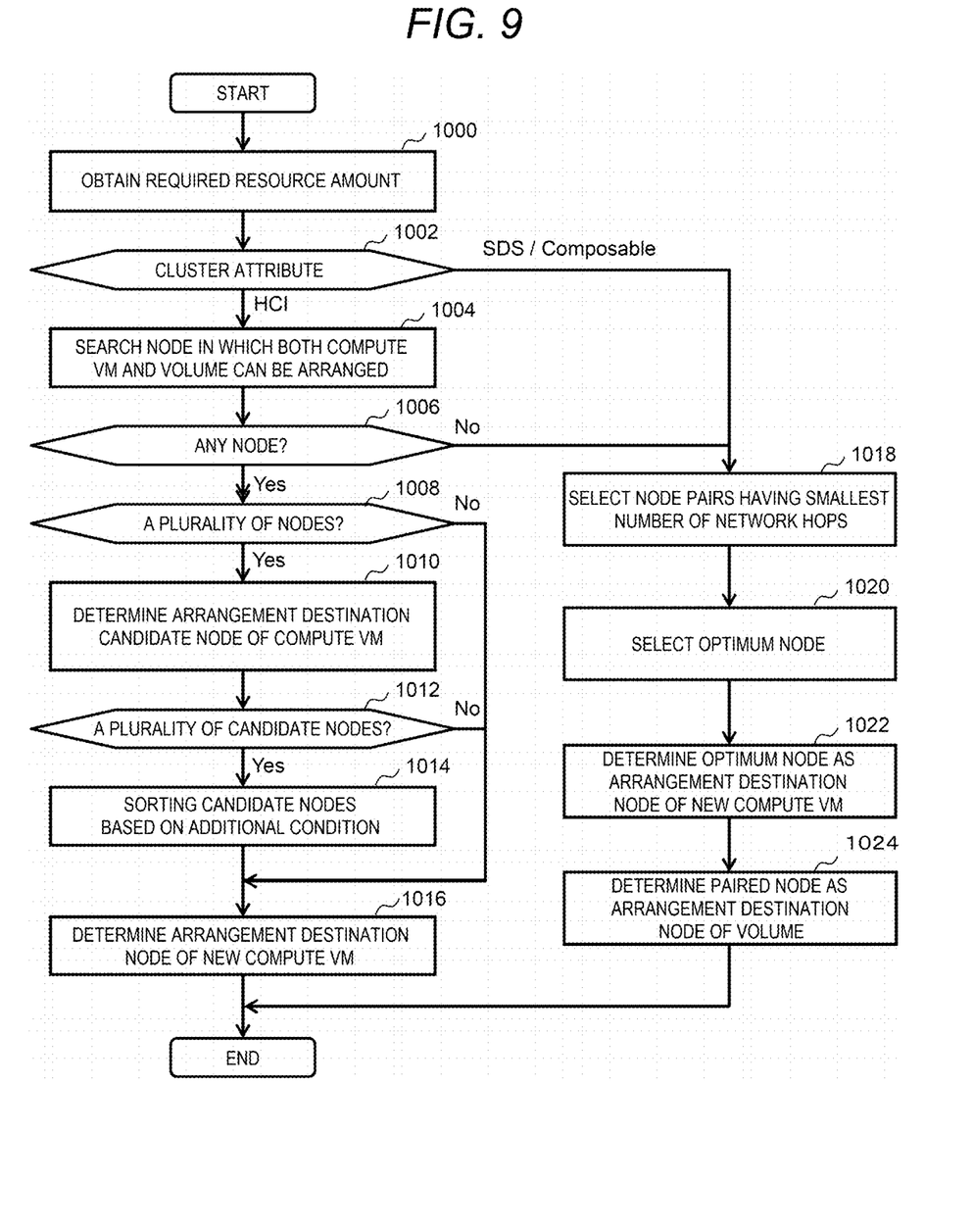
FIG. 9 is a flowchart showing details of arrangement destination node determination processing in FIG. 8.

Next, details of arrangement destination node determination processing (906 in FIG. 8) will be described. FIG. 9 is a flowchart showing an example thereof. The arrangement destination node determination program 442 obtains the required resource amounts (the number of CPU cores, memory capacity, volume capacity) of the new VM from the cluster management program 441 (1000).

Next, the arrangement destination node determination program 442 refers to the resource separation availability table 446 (FIG. 7) and determines the cluster attribute (1002). If the arrangement destination node determination program 442 determines that the cluster attribute is "HCI", the processing proceeds to step 1004.

The arrangement destination node determination program 442 refers to the free resource management table 444, and searches for a node that can allocate, by the node itself, both a compute VM including the number of CPU cores and the memory capacity, and the volume capacity, which are obtained in the previous step 1000. The arrangement destination node determination program 442 determines the presence or absence of the node based on a search result (1006).

If the arrangement destination node determination program 442 affirms the determination, the arrangement destination node determination program 442 determines whether a plurality of nodes are present (1008). If a plurality of nodes are present, the arrangement destination node determination program 442 evaluates resource amounts to be allocated to the compute VM in each of the plurality of nodes. The evaluation includes determination of a balance of the resource amount (ratio) of each of the plurality of types of resources between the plurality of types of resources. The arrangement destination node determination program 442 determines an arrangement destination candidate node of the compute VM from the plurality of nodes based on the result (1010).

Therefore, an embodiment of the determination processing will be described. The arrangement destination node determination program 442 refers to the VM management table 443 for each of the plurality of nodes determined in step 1008, and accumulates the resource amount allocated to one or more compute VMs existing in the node for each resource type. The same applies to the storage VM. The storage VM of the node may be one or plural. A pair of compute VMs may be determined for each of the plurality of storage VMs.

Figure 10:
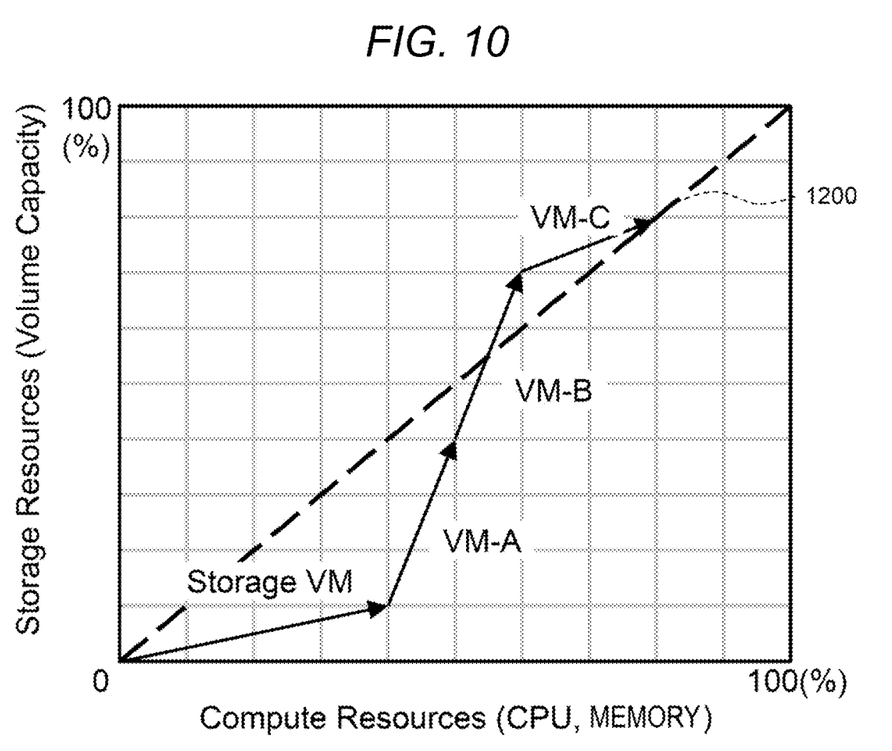
FIG. 10 is a characteristic diagram showing a balance between two types of resources, that is, a balance between compute resources (the number of CPU cores, memory capacity) and storage resources (volume capacity).

As shown in FIG. 10, it is assumed that a node includes one storage VM and three compute VMs (compute VM-A to VM-C). It is assumed that the storage VM, the compute VM-A, and the compute VM-B exist in the node, and the compute VM-C is a new one to be arranged in the node. FIG. 10 is a characteristic diagram showing a balance between two types of resources, that is, a balance between compute resources (the number of CPU cores, memory capacity) and storage resources (volume capacity). The storage resources are storage drives (storage pool) of the node itself.

The storage VM also consumes the compute resources to perform a volume service and consumes the storage resources to manage a volume. The compute VM may consume the compute resources to perform an application service, and may consume the storage resources for a volume used by the compute VM.

The storage VM consumes 40% of all compute resources and occupies 10% of all storage resources. The compute VM-A consumes 10% of all compute resources and 30% of all storage resources. The compute VM-B consumes 10% of all compute resources and has consumed 30% of all storage resources. The compute VM-C is going to consume 20% of all compute resources and is going to consume 10% of all storage resources.

A total resource amount of the storage VM, the compute VM-A, and the compute VM-B includes 60% of the compute resources and 70% of the storage resources. After adding the compute VM-C to the node, the total resource amount includes 80% of the compute resources and 80% of the storage resources, and the compute resources and the storage resources are balanced.

In FIG. 10, reference numeral 1200 indicates a reference line in which a total consumption ratio of the compute resources of the compute VM and the storage VM and a total consumption ratio of the storage resources thereof are balanced, and indicates that the closer the total consumption ratio of the compute resources and the total consumption ratio of the storage resources are to the reference line, the more efficiently in a balanced manner the plurality of resources of the node are used, that is, the higher the effective utilization ratio is.

When the arrangement destination node determination program 442 determines a node to which a new compute VM (compute VM-C) to be arranged, any node, whose coordinates of the total consumption ratio of the compute resources and the total consumption ratio of the storage resources after adding the new compute VM to the existing VM of the node are closest to the reference line 1200, may be an arrangement destination candidate node of the new compute VM.

FIG. 10 shows that the total consumption ratio of the compute resources and the total consumption ratio of the storage resources after adding the new compute VM-C to the node coincide with the reference line 1200. In other words, it means that a node having a minimum difference between free ratios (remaining ratios) or total consumption ratios of a plurality of resources (compute resources and storage resources) after allocating the new compute VM to the node is set as an initial arrangement destination candidate of VM.

As described above, the number of CPU cores and the memory capacity are collected as the compute resources, and the resource amount is compared in two dimensions between the compute resources and the storage resources, but the comparison is not limited to the aspect. For example, the free ratios or the total consumption ratios of the resources may be compared between three-dimensional resources of the number of CPU cores, the memory capacity, and the volume capacity. In comparison between three-dimensional or more resources, for example, a node having the smallest standard deviation of the free ratio of each resource is selected. Here, the total consumption ratio of each resource may be used instead of the free ratio of each resource. Further, instead of the standard deviation, a variance may be used, or a Euclidean distance between the reference line 1200 and a vertex of the VM-C may be used.

Further, although FIG. 10 shows total resource consumption ratios of the storage VM and the compute VMs, the invention is not limited to the aspect. For example, total resource consumption ratios of the compute VMs may be shown with a vertical axis and a horizontal axis being ratios of all compute resources available to the compute VMs.

The arrangement destination node determination program 442 determines whether a plurality of candidate nodes are present (1012), and if it is determined that a plurality of candidate nodes are present, the processing proceeds to step 1014. In step 1014, the plurality of candidate nodes are evaluated based on an additional condition, and in step 1016, an arrangement destination node of the new compute VM is determined from the plurality of candidate nodes based on the result.

The additional condition is, for example, a node having the largest total resource consumption amount (ratio) including a resource consumption amount of the new compute VM, in other words, a node having the smallest free resource amount (ratio), or a node having the smallest total resource consumption amount, in other words, a node having the largest free resource amount. In the former case, a resource occupancy ratio of the node in which the new compute VM is arranged can be increased, and in the latter case, a resource utilization ratio is more averaged among the plurality of nodes.

If the arrangement destination node determination program 442 determines in step 1002 that the cluster attribute is an attribute other than HCI (SDS, composable), the processing proceeds to step 1018, and in step 1006, when no nodes are present in which both the compute VM and the volume can be arranged, the processing also proceeds to step 1018.

The arrangement destination node determination program 442 refers to the free resource management table 444, and selects a first node that has space to arrange the compute VM and a second node that has space to arrange the volume and that is different from the first node. The arrangement destination node determination program 442 further refers to the inter-node network hop number management table 445 and selects, from combinations of both nodes, pairs of two nodes between which the number of network hops, that is, the network distance between the nodes is the smallest. In an example of the inter-node network hop number management table 446 of FIG. 7, the pairs of nodes, between which the number of hops is the smallest, are HCI Node-1 and HCI Node-2, HCI Node-1 and HCI Node-3, and HCI Node-2 and HCI Node-3.

In step 1020, when a plurality of selected pairs are present, for each of the plurality of pairs, the arrangement destination node determination program 442 determines a balance of the resource amounts between the plurality of resources (CPU and memory) after applying the resource amounts of the compute VM to each candidate node in which the compute VM is to be arranged, and selects an optimum node having balanced resource amounts.

The arrangement destination node determination program 224 refers to the free resource management table 444, calculates the free resource amounts (ratios) after applying the resource amounts of the new compute VM to each arrangement candidate node of the new VM, selects the node having the smallest difference in the free resource amounts (ratios) of each of CPU and memory as the optimum node, and determines the optimum node as an initial arrangement destination node of the new VM (1022).

Then, the arrangement destination node determination program 442 determines a node paired with the node as a node to which the volume of the compute VM to be arranged (1024).

Thus, the flowchart of FIG. 10 ends. According to the flowchart, in a cluster having an HCI configuration, even if the management node cannot arrange the volume in the same node as the compute VM, the volume can be arranged in a node having a small number of network switches. Therefore, I/O performance of the compute VM can be prevented from degrading. The I/O performance of the compute VM can be prevented from degrading similarly in clusters having attributes other than HCI.

In step 1014, when a plurality of nodes are to be sorted, the candidate nodes may be selected according to a further additional condition, for example, a magnitude of the node ID. Step 1010 and the subsequent step 1014 may be performed in the order or may be performed in a reverse order.

Figure 11:
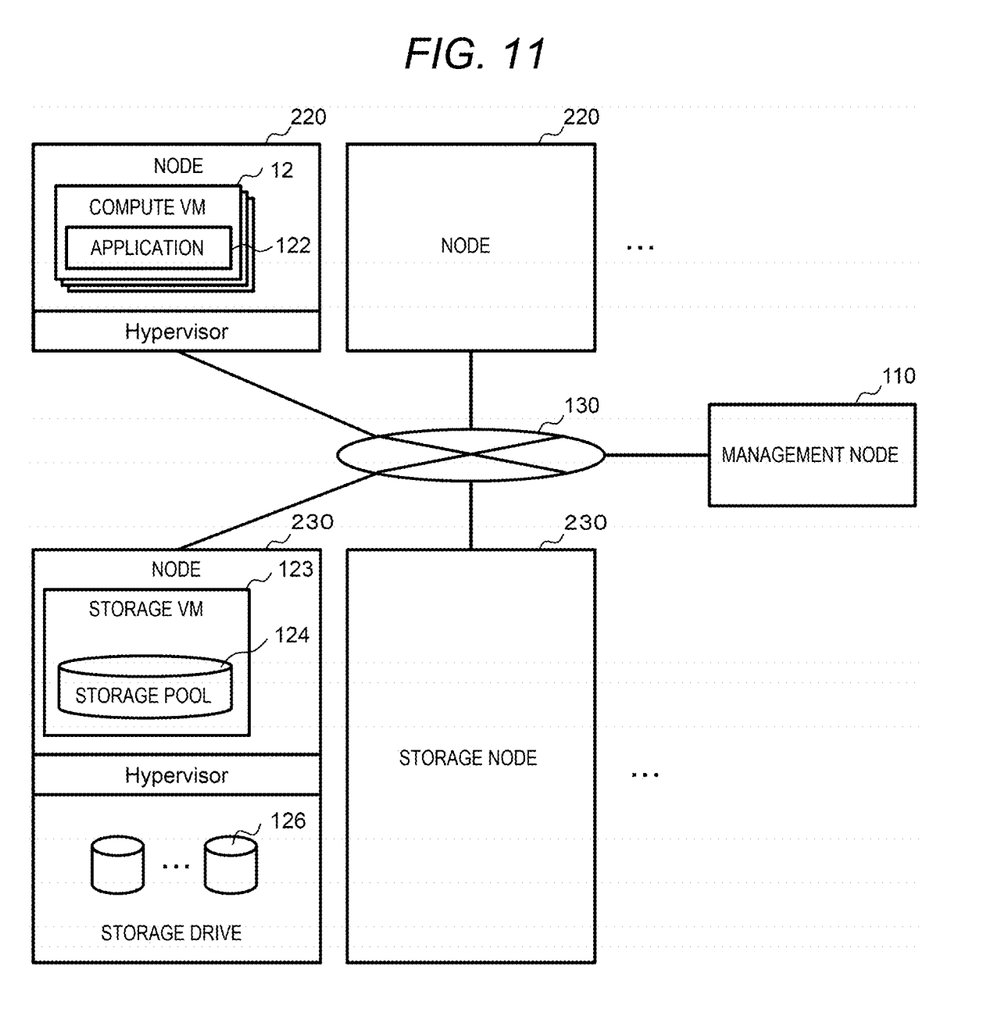
FIG. 11 is an example of a hardware block diagram of a computer system in which a cluster is configured as an SDS.

FIG. 11 shows an example of a hardware block diagram of a computer system in which a cluster type is the SDS described above. In the SDS, a node 220 in which the compute VMs are present and a node 230 in which the storage VM and the storage drives are present are separate from each other. That is, the node 230 does not have the compute resources for the compute VM, but has only the compute resources and the storage resources for operating the storage VM.

Figure 12:
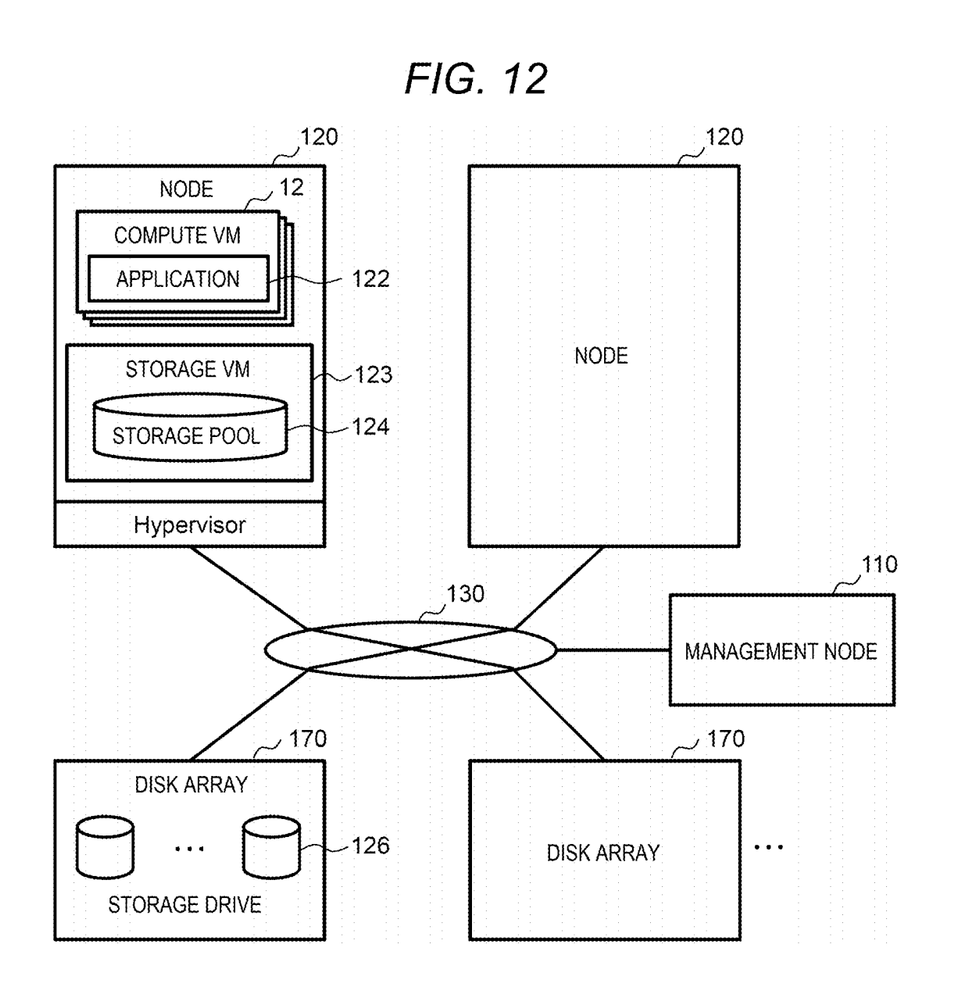
FIG. 12 is an example of a hardware block diagram of a computer system in which a cluster is configured as composable described above.

FIG. 12 shows an example of a hardware block diagram of a computer system in which a cluster is configured as composable as described above. In composable, disk arrays 170 are separated from the nodes 120 each including the computes VM and the storage VM. Specifically, the disk array is a Fabric-attached Bunch of Flash (FBOF) or Just a Bunch of Disks (JBOD).

In the VM management table shown in FIG. 4, in a case of the HCI configuration, 706 and 707 may be filled with the same node, but in a case of SDS or composable, 706 and 707 have to be filled with different nodes. In the case of the SDS, the compute VM arrangement destination node ID is filled with a computer node (compute VM) ID, and a storage node (storage VM) ID is recorded in the volume arrangement destination node ID. In composable, the compute VM arrangement destination node ID is filled with the computer node ID, and the volume arrangement destination node ID is a disk array ID.

In the free resource management table of FIG. 5, for HCI Node-1, a total number of CPU cores is 128, a current free CPU cores is 64, a total memory capacity is 512 GiB, a current free memory capacity is 384 GiB, a total drive capacity is 20,000 GiB, and a current free drive capacity is 8,000. On the other hand, in SDS, for the computer node, the number of CPU cores and the memory capacity (802 to 805) have values, and the drive capacity (806 to 807) has no values, and for the storage node, the number of CPU cores and the memory capacity (802 to 805) have no values, and the drive capacity (806 to 807) has values. In composable, for the computer node, the number of CPU cores and the memory capacity (802 to 805) have values, and the drive capacity (806 to 807) has no values, and for the disk array, the number of CPU cores and the memory capacity (802 to 805) have no values, and the drive capacity (806 to 807) has values.

In the inter-node network hop number management table of FIG. 6, in SDS, the vertical axis represents the computer node ID, the horizontal axis represents the storage node ID, or vice versa, but no diagonal lines similar as in the HCI table are present. In composable, the vertical axis represents the computer node ID, the horizontal axis represents the disk array ID, or vice versa, but no diagonal lines similar as in the HCI table are present.

In the resource separation availability table of FIG. 7, 1011 indicates that a configuration of a cluster 1 is HCI, resource types are the CPU for the compute VM, the memory for the same, and the storage (drive), where the CPU and the memory are inseparable, and the drive is separable. On the other hand, the same applies to SDS and composable.

From a viewpoint of redundancy for protection of storage data, a virtual computer (VM, container) can be initially arranged. The management node may select, as a redundancy destination, a node having a small difference between the free capacity of the compute resources and the free capacity of the storage resources after the arrangement of the compute VM. Further, in consideration of failover, the management node may determine an arrangement destination of the compute VM after estimating a large amount of resource consumption of the redundancy destination. Furthermore, in consideration of errors, the management node can determine the arrangement destination of the compute VM after estimating a large amount of the resource consumption, so as to prevent frequent rearrangement of the compute VM.

What is claimed is:

1. A computer system comprising:
a plurality of nodes each including a processor and a memory;
a storage drive; and
a management device, wherein
the management device is configured to:
   arrange a virtual computer and a volume in which the virtual computer inputs and outputs data in any one of the plurality of nodes, so as to allocate a predetermined resource among resources of the processor, the memory, and the storage drive to the virtual computer and the volume, thereby operating the virtual computer and the volume; and
   when the virtual computer and the volume are capable of being arranged in the same node among the plurality of nodes, determine the same node from the plurality of nodes based on a difference of ratios of resource amounts allocated to the virtual computer and the volume between the plurality of resources.

2. The computer system according to claim 1, wherein the management device is configured to determine the same node such that a difference of ratios of remaining resource amounts after the resources are allocated to the virtual computer and the volume becomes smaller.

3. The computer system according to claim 1, wherein the management device is configured to:
   allocate the resource of the processor and the resource of the memory to the virtual computer, and
   allocates the resource of the processor, the resource of the memory, and the resource of the storage drive to the volume.

4. The computer system according to claim 3, wherein the storage drive is provided in each of the plurality of nodes, and
the management device is configured to determine the same node from the plurality of nodes based on a difference of ratios of allocated resource amounts between the resource of the processor, the resource of the memory, and the resource of the storage drive.

5. The computer system according to claim 3, wherein the storage drive is provided outside the plurality of nodes so as to be shared by the plurality of nodes, and
the management device is configured to determine a node in which the virtual computer and the volume are to be arranged from the plurality of nodes based on a difference of ratios of allocated resource amounts between the resource of the processor and the resource of the memory.

6. The computer system according to claim 1, wherein when the virtual computer and the volume are not capable of being arranged in the same node, the management device selects two different nodes in which the virtual computer and the volume are to be respectively allocated from the plurality of nodes based on a network distance between each two nodes in the plurality of nodes and a difference of ratios of allocated resource amounts between the plurality of resources of each two nodes in the plurality of nodes.

* * * * *